(12) United States Patent
Nishimura et al.

(10) Patent No.: US 6,585,862 B1
(45) Date of Patent: Jul. 1, 2003

(54) APPARATUS AND METHOD FOR HANDLING EASILY POLYMERIZABLE COMPOUND

(75) Inventors: Takeshi Nishimura, Himeji (JP); Yukihiro Matsumoto, Kobe (JP)

(73) Assignee: Nippon Shokubai, Osaka (JP)

( * ) Notice: Subject to any disclaimer, the term of this patent is extended or adjusted under 35 U.S.C. 154(b) by 0 days.

(21) Appl. No.: 09/642,578

(22) Filed: Aug. 19, 2000

(30) Foreign Application Priority Data

Sep. 10, 1999 (JP) ............................. 11-257073

(51) Int. Cl.⁷ ..................... B01D 3/00; B01D 3/32; C07C 51/44
(52) U.S. Cl. ................. 203/8; 203/49; 203/90; 562/600
(58) Field of Search ................ 203/49, 8, 90, 203/DIG. 21, 1–2; 562/600; 202/236, 242, 262

(56) References Cited

U.S. PATENT DOCUMENTS

| 3,717,553 A | * | 2/1973 | Otsuki et al. ............... 202/158 |
| 4,263,448 A | * | 4/1981 | Leacock ..................... 562/600 |
| 4,369,097 A | | 1/1983 | Nezu et al. |
| 4,813,283 A | | 3/1989 | Craubner |
| 4,987,252 A | * | 1/1991 | Kuragano et al. .......... 562/600 |
| 5,458,739 A | | 10/1995 | Boucher et al. |
| 5,897,749 A | * | 4/1999 | Kroker et al. ....... 203/DIG. 21 |
| 6,372,944 B1 | * | 4/2002 | Matsumoto et al. ........ 562/600 |

FOREIGN PATENT DOCUMENTS

| DE | 2031552 | 12/1971 |
| DE | 32 09 425 A1 | 2/1983 |
| GB | 2 048 089 | 12/1980 |

* cited by examiner

Primary Examiner—Virginia Manoharan
(74) Attorney, Agent, or Firm—Haugen Law Firm PLLP

(57) ABSTRACT

The present invention provides an apparatus for handling an easily polymerizable compound such as (meth)acrylic acid which includes a tubular member that is furnished to a side wall of the apparatus and opened to the inside of the apparatus, specifically, for example, an apparatus and a method which effectively inhibit the polymerization of (meth)acrylic acid in a distillation column for (meth)acrylic acid wherein the distillation column has such as an inlet or outlet of gas or liquid, a manhole, or a tube into which an instrument is inserted. The tubular member (e.g. an inlet or outlet, a manhole, a tube into which an instrument is inserted) is set so as to have a downward gradient ($\alpha$) in the range of 3° to 70° toward the inside of the apparatus.

13 Claims, 6 Drawing Sheets

(a)

(b)

(c)

(a)

(b)

APPARATUS AND METHOD FOR HANDLING EASILY POLYMERIZABLE COMPOUND

BACKGROUND OF THE INVENTION

A. Technical Field

The present invention relates to an apparatus and a method for handling an easily polymerizable compound, specifically, relates to: an apparatus which can effectively inhibit the polymerization of (meth)acrylic acid etc. when the (meth)acrylic acid etc. are handled by distillation etc.; and a method for handling the (meth)acrylic acid etc. with this apparatus.

B. Background Art

It is well-known that: (meth)acrylic acid etc. so easily polymerize that their polymerization often occurs in their production process, with the result that stopping the apparatus cannot be helped. For countermeasures against it, when (meth)acrylic acid etc. are produced, polymerization inhibitors such as hydroquinone, phenothiazine, and molecular-oxygen-containing gases are added, and further, the inner surface of the apparatus which is used is subjected to surface treatment for preventing solids such as polymers and deposits from attaching to the apparatus.

However, even if the above countermeasures are made, the occurrence of the polymerization cannot sufficiently be inhibited, but is unavoidable. Therefore, in the case where tubes are clogged with the resultant polymers, the operation is stopped to remove them manually or chemically.

As to such an apparatus, a tubular member that serves for example as an outlet or inlet through which substances are discharged from or charged into the inside of the apparatus or as a portion to which an instrument seat is fitted is usually furnished to a side wall of the apparatus, and the polymerization easily occurs particularly in this tubular member.

SUMMARY OF THE INVENTION

A. Object of the Invention

The present invention has been made under the above circumferences, and an object of the present invention is to provide an apparatus and a method which effectively inhibit the occurrence of the polymerization of easily polymerizable compounds such as (meth)acrylic acid when they are produced.

B. Disclosure of the Invention

The present inventors diligently studied and, as a result, completed the present invention by finding that, when the easily polymerizable compounds such as (meth)acrylic acid are distilled, gases condense either in a tubular member that is furnished to a distillation column or on surfaces of instruments as inserted into this tubular member, and liquids as formed by this condensation reside unavoidably to cause the occurrence of the polymerization, and further that, for inhibiting this residence of the condensates in the tubular member or on the surfaces of the instruments, it is enough that the tubular member which is furnished to a side wall of the apparatus is tilted so as to have a downward gradient toward the inside of the apparatus.

That is to say, the present invention relates to an apparatus for handling an easily polymerizable compound, which comprises a tubular member that is furnished to a side wall of the apparatus and opened to the inside of the apparatus, with the apparatus being characterized in that the tubular member is set so as to have a downward gradient ($\alpha$) toward the inside of the apparatus.

The present invention further relates to a method for handling an easily polymerizable compound, which involves the use of the immediately above-mentioned apparatus when handling the easily polymerizable compound.

These and other objects and the advantages of the present invention will be more fully apparent from the following detailed disclosure.

DETAILED DESCRIPTION OF THE INVENTION

The "easily polymerizable compound" as referred to in the present invention means a compound which easily polymerizes to form a polymer when being handled by such as its reaction or distillation, and typical examples thereof include (meth)acrylic acid and their esters such as methyl esters, ethyl esters, n-propyl esters, isopropyl esters, n-butyl esters, isobutyl esters, 2-hydroxyethyl esters, and N,N-dimethylaminoethyl esters. These are handled alone respectively or in forms of their mixtures or liquids containing them.

In addition, the "handling" as referred to in the present invention means all operations that are needed for producing the easily polymerizable compound, such as reaction, distillation, extraction, absorption, storage, and heat-exchange.

Accordingly, the "apparatus" according to the present invention, for example, implies those which are used to carry out the above handling (e.g. reaction, distillation, extraction, absorption, storage, and heat-exchange), such as reactors, distillation columns, and their attachments (e.g. heat-exchangers, tanks), and this apparatus is furnished with a tubular member in its side wall wherein the tubular member is opened to the inside of the apparatus.

An explanation is given below about the tubular member that is furnished to a side wall of the apparatus according to the present invention and opened to the inside of the apparatus. FIGS. 1 to 10 illustrate typical examples of the tubular member according to the present invention.

Figure 1:
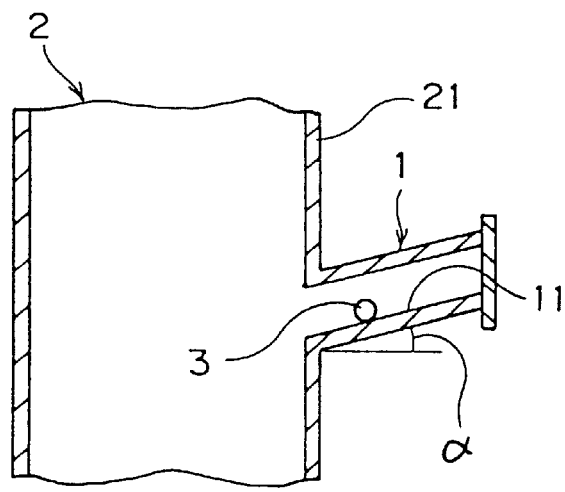
FIG. 1 is a sectional illustration of a tubular member as furnished to the apparatus according to the present invention.

The tubular member 1 of FIG. 1 is a so-called inlet nozzle or outlet nozzle for introducing a gas, liquid, or solid, or a fluid that is their mixture phase, into the apparatus 2 or getting out them therefrom. This fluid may be either the easily polymerizable compound itself or another.

The tubular member 1 is furnished to a side wall 21 of the apparatus 2 and opened to the inside of the apparatus 2 and, as shown in the figure, this tubular member is set so as to have a downward gradient ($\alpha$) toward the inside of the apparatus 2.

The present invention is characterized in that the tubular member 1 is set so as to have a downward gradient ($\alpha$) toward the inside of the apparatus 2. If the tubular member is given such a gradient, a condensate 3 on an inner wall surface 11 of the tubular member 1 rapidly falls downward and is therefore prevented from residing, with the result that the polymerization can effectively be inhibited. In such a respect, the gradient ($\alpha$) is preferably in the range of 3° to 70°, more preferably in the range of 5° to 60°. In the case where the gradient ($\alpha$) is too little, the condensate does not rapidly fall, therefore the polymerization inhibition effect is not sufficiently obtained. Incidentally, in the case where the gradient ($\alpha$) is too much, there are unfavorable problems about the connection to such as piping.

In the present invention, all the tubular members that are furnished to a side wall of the apparatus do not need to be given the gradient ($\alpha$), but it is preferable to give the gradient ($\alpha$) to, particularly among the tubular members, those which is under an atmosphere under which a gas phase or a gas-liquid mixed phase easily condenses on the inner and outer wall surfaces of the in-apparatus portion and/or the inner wall surface of the out-of-apparatus portion.

Figure 2:
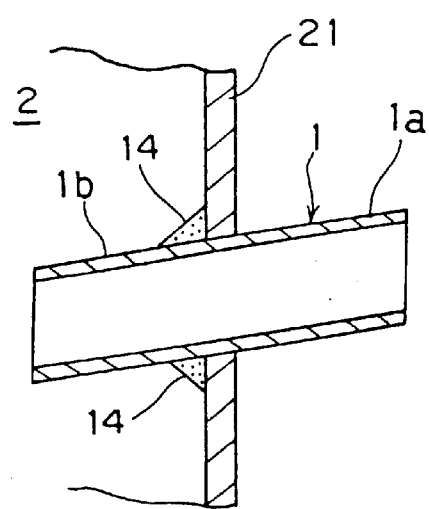
FIG. 2 is a sectional illustration of another tubular member as furnished to the apparatus according to the present invention.

The tubular member 1 of FIG. 2 does not only have a portion 1a as projects out of the apparatus 2 like in the case shown in FIG. 1, but also has a portion 1b as inserted in the apparatus 2. Namely, this tubular member comprises an out-of-apparatus portion (A) and an in-apparatus portion (B) of the tubular member.

Figure 3:
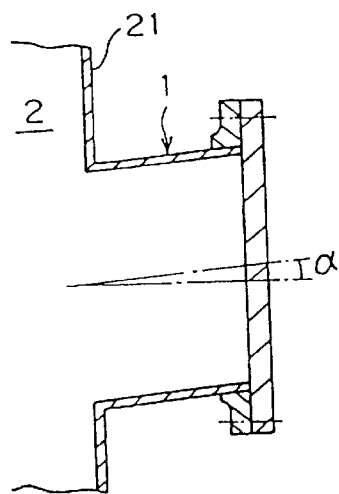
FIG. 3 shows sectional illustrations of three forms (a), (b), (c) of manhole type tubular members.
Figure 3:
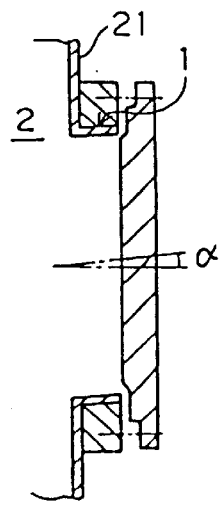
Figure 3:
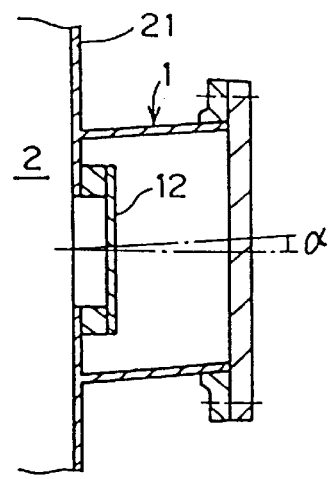
Figure 4:
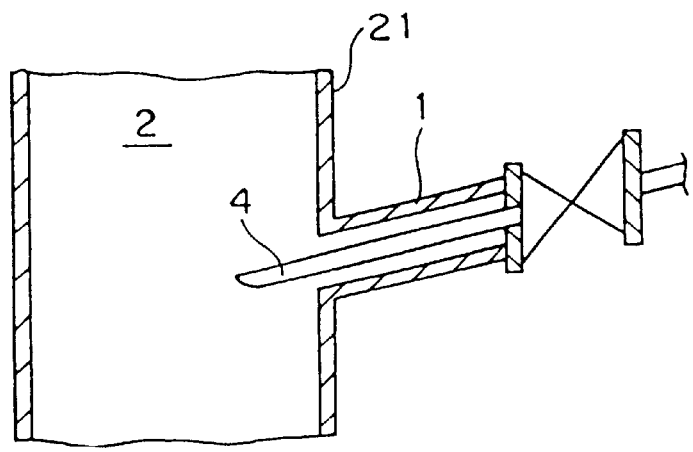
FIG. 4 shows sectional illustrations of two forms (a), (b) of instrument seat type tubular members.
Figure 4:
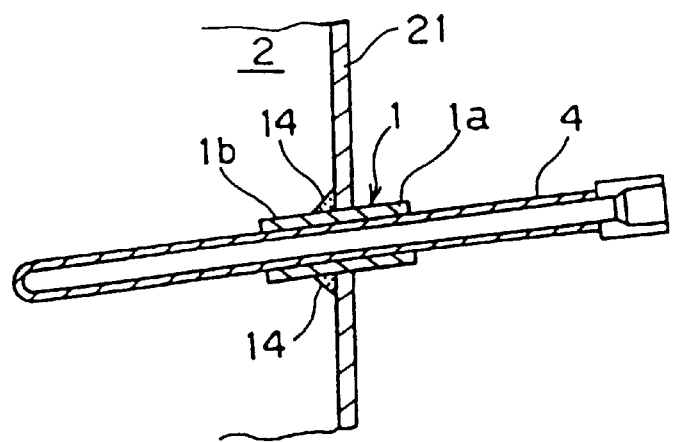

FIGS. 3, and 4 illustrate various forms of tubular members. The three tubular members of FIG. 3 are (a) a conventional manhole or handhole, (b) a pad type manhole or handhole, and (c) a manhole with an inner lid, respectively.

The tubular member 1 of FIG. 4(a) is an example used as an insertion tube or a seat for an instrument 4 such as a pressure gauge or a liquid level indicator among the types of FIG. 1, and the tubular member 1 of FIG. 4(b) is an example used as a seat for an instrument 4 such as a thermometer among the types of FIG. 2 (the tubular member of FIG. 2 to which the seat for the instrument is fitted, as shown in FIG. 4(b), is also included in examples of the tubular member which is open to the inside of the apparatus).

As to the tubular member 1 in the present invention, it is preferable that a portion 1a as projects out of the apparatus 2 is shortened as much as possible and that a pad type tubular member of FIG. 3(b) is preferred to the tubular member of FIG. 1, because the inner wall surface area of the out-of-apparatus portion of the tubular member is thereby reduced to prevent the condensate from residing on the inner wall surface, with the result that the polymerization can effectively be inhibited.

Figure 5:
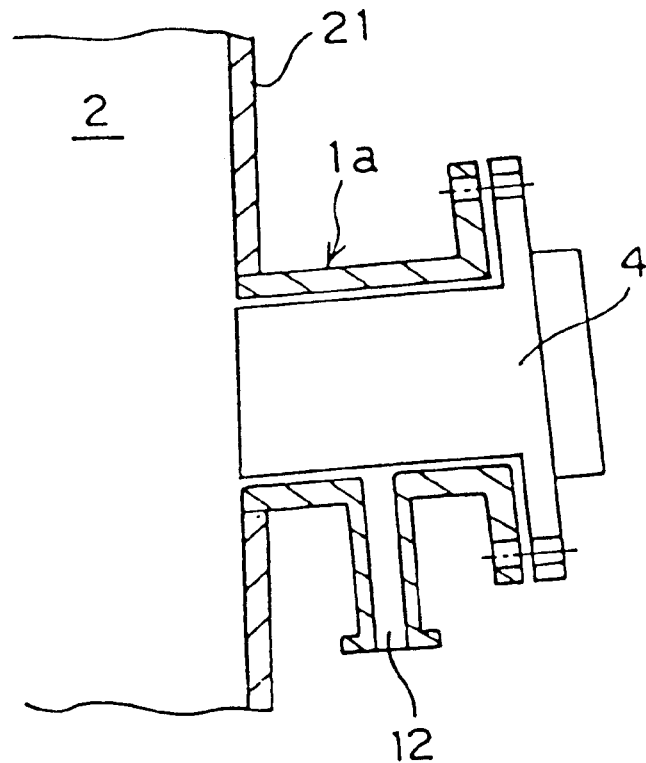
FIG. 5 is a sectional illustration of a tubular member of which the out-of-apparatus portion is equipped with an inlet for injecting a molecular-oxygen-containing gas and/or a polymerization inhibitor.

As to the tubular member in the present invention, it is preferable to add a molecular-oxygen-containing gas and/or a polymerization inhibitor, which are conventionally used as polymerization inhibitors, into the out-of-apparatus portion 1a for the purpose of inhibiting the polymerization inside the out-of-apparatus portion 1a. FIG. 5 illustrates an example of such a preferable case and is such that the out-of-apparatus portion 1a is equipped with an inlet 12 for injecting a molecular-oxygen-containing gas and/or a polymerization inhibitor. For example, in the case where, as shown in FIG. 5, an instrument 4 such as a diaphragm type liquid level indicator is inserted into the tubular member 1 of FIG. 1, a small clearance is made between the inner wall surface of the tubular member 1 and the outer wall surface of the instrument 4, and the liquid tends to reside in this clearance, therefore it is preferable to inhibit the polymerization by injecting the molecular-oxygen-containing gas and/or the polymerization inhibitor from the inlet 12 as shown in FIG. 5.

Figure 6:
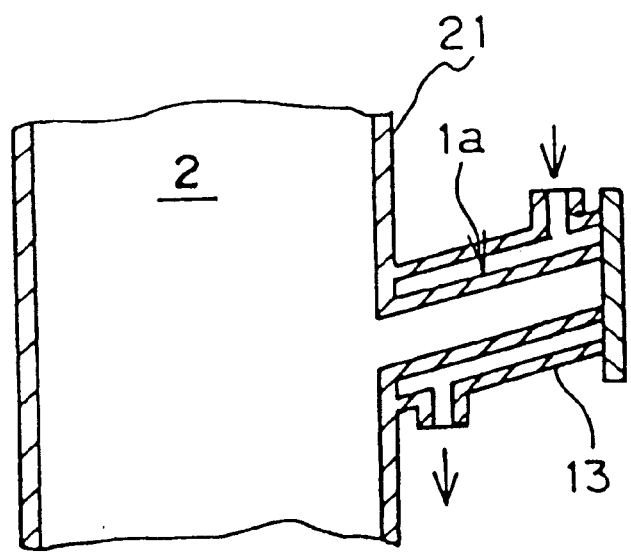
FIG. 6 is a sectional illustration of a tubular member as equipped with a temperature-raising or heating means.
Figure 7:
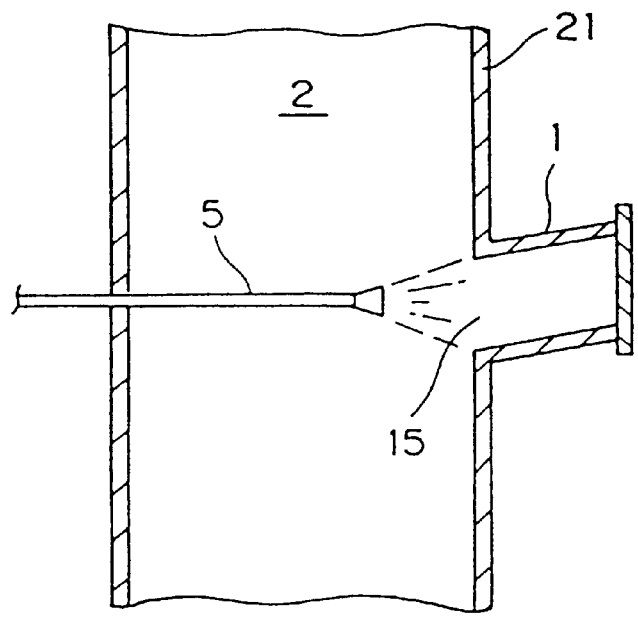
FIG. 7 is a sectional illustration of a state where a polymerization-inhibitor-containing liquid is sprayed to a tubular member.

In FIG. 6, the out-of-apparatus portion 1a of the tubular member 1 is equipped with a temperature-raising or heating means 13 such as a steam jacket. If the out-of-apparatus portion 1a of the tubular member 1 is temperature-raised or heated, then the gas is prevented from condensing on the inner wall surface of the tubular member, therefore not only the residence of the condensate, but also the occurrence of the polymerization can more effectively be inhibited. It is not only permissible that the temperature-raising or heating means 13 is provided to the whole of the out-of-apparatus portion 1a, but it is also permissible that the temperature-raising or heating means 13 is provided to only a part of the out-of-apparatus portion 1a. Examples of the temperature-raising or heating means 13 include an electric or steam heater tracing as well as a jacket through the inside of which a heating medium can be circulated.

As to the tubular member 1 of FIG. 2, the condensate tends to reside on the periphery of a portion where the in-apparatus portion 1b of the tubular member is in contact with an inner wall surface 21 of the apparatus, therefore it is preferable that the whole peripheral portion is welded and that the resultant welded portion 14 is surface-smoothed. This smoothing is preferably to such an extent that beads can disappear from the surface of the weld, specifically, Rmax according to JIS B0601 (1994) can be 12.5S or lower. Also in the case of FIG. 4(b) where a thermometer seat is inserted in the tubular member of FIG. 2, it is preferable that, as is shown in this figure, the whole peripheral portion where an instrument seat which is a tubular member 1 is in contact with the inner wall surface 21 of the apparatus is welded and that the resultant welded portion 14 is surface-smoothed.

Figure 8:
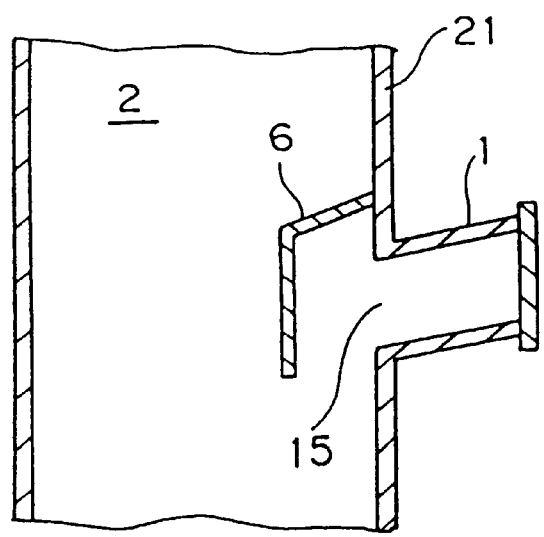
FIG. 8 is a sectional illustration of a state where an opening of a tubular member to the inside of the apparatus is equipped with a cover.

It is also effective that a means 5 of spraying a polymerization-inhibitor-containing liquid to an opening 15 of the tubular member 1 to the inside of the apparatus is equipped (FIG. 7), or that the opening 15 of the tubular member 1 to the inside of the apparatus is equipped with a cover 6 to lessen the influence of the condensate falling on the inside wall of the apparatus (FIG. 8).

Figure 9:
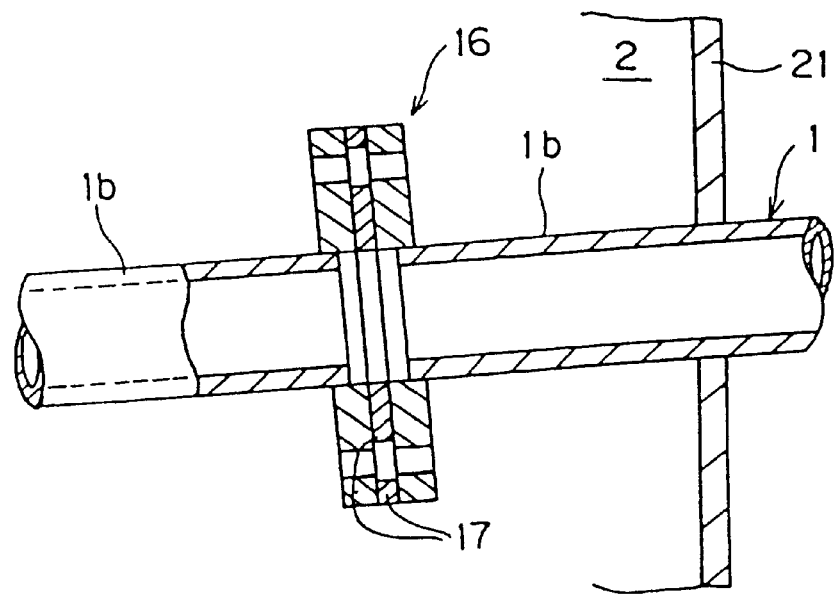
FIG. 9 is a sectional illustration of a tubular member having a flange to the inside of the apparatus in the present invention.
Figure 10:
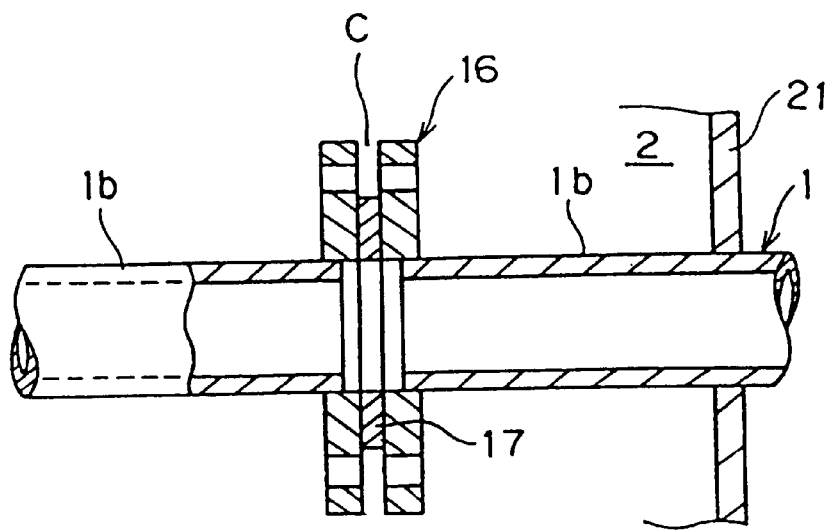
FIG. 10 is a sectional illustration of a conventional tubular member having a flange to the inside of the apparatus.

FIG. 9 illustrates a tubular member 1 having a flange-bonded portion 16 on the in-apparatus portion 1b. As to a conventional tubular member 1 of FIG. 10, a gasket 17 which is fitted to a flange-bonded portion 16 does not have the same diameter as that of the flange, so a concave (clearance) portion C is present. Therefore, the condensate tends to reside in this clearance portion C to form a polymer. In contrast, in the present invention, as is shown in FIG. 9, a gasket 17 having the same diameter as that of the flange is used to make substantially no concave (clearance) portion C. In this way, in the present invention, it is preferable that the in-apparatus portion 1b of the tubular member 1 is substantially free of concave (concave-free).

The tubular members according to the present invention are illustrated above on the basis of the drawing figures, but the present invention is not limited to these tubular members, but also encompasses such as a sight glass and a pressure equalizer.

The place where the tubular member according to the present invention is furnished is not especially limited, but can be selected fitly according to its use purpose.

Next, an explanation is made about the method for handling an easily polymerizable compound which involves the use of the above apparatus according to the present invention. This handling method can be carried out in the same way as of conventional handling methods except the use of the apparatus according to the present invention.
(Effects and Advantages of the Invention):

The apparatus according to the present invention can effectively prevent the residence of the condensate and therefore can effectively inhibit the polymerization of the easily polymerizable compound. Thus, the easily polymerizable compound can be produced in a high yield. Especially, the easily polymerizable compound can be handled stably for a long period of time.

In addition, by the method according to the present invention, the easily polymerizable compound can be handled easily while its polymerization is effectively inhibited.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples.

EXAMPLE 1

A liquid containing an acrylic ester was purified with a stainless-steel-made (SUS316) rectifying apparatus as equipped with a distillation column, a condenser, and a reboiler. The below-mentioned tubular members were furnished to the distillation column, the condenser, and the reboiler so as to have their respective gradients below. Incidentally, as to the manhole or handhole, a pad type was used.
Distillation Column:

Seats for instruments (thermometer, pressure gauge, liquid level indicator): 3°

Pressure-equalizing vent, pressure measurement seat (column top, column bottom): 6°

Manhole (column top, column bottom): 5°

Condenser:

Gas outlet: 10°

Pressure measurement seat: 60°

Reboiler:

Manhole or handhole: 6°

The feed composition of the acrylic ester was 2-ethylhexyl acrylate 60 weight %, 2-ethylhexanol 32 weight %, and acrylic acid 7 weight %.

The apparatus was operated continuously for 3 months under conditions where column top absolute pressure=30 mmHg (=about 4.00 kPa), column top temperature=98° C., column bottom absolute pressure=65 mmHg (=about 8.67 kPa), column bottom temperature=135° C., reflux ratio=0.9. After the operation had been stopped, the inside of the apparatus was inspected. As a result, the attachment of the resultant polymer was not found on any tubular member.

COMPARATIVE EXAMPLE 1

The liquid containing the acrylic ester was distilled in the same way as of Example 1 except that all the tubular members were furnished horizontally to the same apparatus as that used in Example 1. The apparatus was operated continuously for 3 months. After the operation had been stopped, the inside of the apparatus was inspected. As a result, the attachment of the resultant polymer was found on some of the tubular members. In addition, the manhole which was set on the column bottom was entirely clogged with the resultant polymer, and therefore could not manually be opened.

The present invention includes a method for effectively inhibiting polymerization of an easily polymerizable compound where the method includes the steps of: a) feeding an easily polymerizable compound to an apparatus, wherein the apparatus includes a sidewall and an inside; b) providing a tubular member on the sidewall of the apparatus, wherein the tubular member opens to the inside of the apparatus; and c) setting the tubular member to have a downward gradient ($\alpha$) toward the inside of the apparatus, flowing condensate downwardly in the tubular member, and preventing condensate from residing in the tubular member such that polymerization of the easily polymerizable compound is effectively inhibited. The size of the tubular member can be fixed such that a man or hand can enter the tubular member. An insertion tube or instrument can be fixed axially in the tubular member.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A method for effectively inhibiting polymerization of an easily polymerizable compound comprising the steps of:
   a) feeding an easily polymerizable compound to an apparatus, wherein the apparatus includes a sidewall and an inside;
   b) providing a tubular member on the sidewall of the apparatus, wherein the tubular member opens to the inside of the apparatus;
   c) setting the tubular member to have a downward gradient ($\alpha$) toward the inside of the apparatus, flowing condensate downwardly in the tubular member, and preventing condensate from residing in the tubular member such that polymerization of the easily polymerizable compound is effectively inhibited; and
   d) wherein the step of setting the tubular member comprises the step of fixing the gradient ($\alpha$) in a range of 3° to 70° relative to the horizontal.

2. The method of claim 1 and further comprising the steps of:
   a) providing an out-of-apparatus portion to the tubular member, wherein the out-of-apparatus portion includes an inner wall surface, wherein the out-of-apparatus portion includes a length, wherein the length of the out-of-apparatus portion is measured from the sidewall to an end of the out-of-apparatus portion; and
   b) minimizing the length of the out-of-apparatus portion to prevent condensate from residing on the inner wall surface of the out-of-apparatus portion.

3. The method of claim 1 and further comprising the step of providing an out-of-apparatus portion to the tubular member, wherein the out-of-apparatus portion includes an inlet for injecting a molecular-oxygen-containing gas and/or polymerization inhibitor into the tubular member.

4. The method of claim 1 and further comprising the step of providing an out-of-apparatus portion to the tubular member, wherein the out-of-apparatus portion of the tubular member is equipped with a temperature-raising or heating means.

5. The method of claim 1, and further comprising the steps of:
   a) providing an in-apparatus portion to the tubular member;
   b) providing an inner wall to the apparatus;
   c) welding a whole peripheral portion between the in-apparatus portion and the inner wall; and
   d) smoothing a surface of the whole peripheral portion.

6. The method of claim 1 and further comprising the step of spraying a polymerization-inhibitor-containing liquid into an opening of the tubular member and to the inside of the apparatus.

7. The method of claim 1 and further comprising the steps of:
   a) providing an opening for the tubular member where the tubular member opens to the inside of the apparatus; and
   b) providing a cover for the opening of the tubular member to the inside of the apparatus.

8. The method of claim 1 and further comprising the step of selecting a hand hole for the tubular member.

9. The method of claim 1 and further comprising the step of selecting a man hole for the tubular member.

10. The method of claim 1 and further comprising the step of fixing an insertion tube axially in the tubular member.

11. The method of claim 1 and further comprising the step of fixing an instrument axially in the tubular member.

12. A method for effectively inhibiting polymerization of an easily polymerizable compound comprising the steps of:
   a) feeding an easily polymerizable compound to an apparatus, wherein the apparatus includes a sidewall and an inside;
   b) providing a tubular member on the sidewall of the apparatus, wherein the tubular member opens to the inside of the apparatus;
   c) setting the tubular member to have a downward gradient ($\alpha$) toward the inside of the apparatus, flowing condensate downwardly in the tubular member, and preventing condensate from residing in the tubular member such that polymerization of the easily polymerizable compound is effectively inhibited;
   d) providing an in-apparatus portion to the tubular member;
   e) providing a clearance on the in-apparatus portion; and
   f) engaging an article in the clearance to remove the clearance such that condensate may not reside in the clearance.

13. A method for effectively inhibiting polymerization of an easily polymerizable compound comprising the steps of:
   a) feeding an easily polymerizable compound to an apparatus, wherein the apparatus includes a sidewall and an inside;
   b) providing a tubular member on the sidewall of the apparatus, wherein the tubular member opens to the inside of the apparatus;
   c) setting the tubular member to have a downward gradient ($\alpha$) toward the inside of the apparatus, flowing condensate downwardly in the tubular member, and preventing condensate from residing in the tubular member such that polymerization of the easily polymerizable compound is effectively inhibited;
   d) providing an in-apparatus portion to the tubular member, wherein the in-apparatus portion includes tubular portions engaged together with flanges, wherein a clearance exists between said flanges; and
   e) engaging a gasket between the flanges to remove the clearance such that condensate may not reside in the clearance.

* * * * *